United States Patent [19]
Berkowitz

[11] 3,886,153
[45] May 27, 1975

[54] PURIFICATION OF CYANURIC ACID
[75] Inventor: Sidney Berkowitz, Highland Park, N.J.
[73] Assignee: FMC Corporation, New York, N.Y.
[22] Filed: Jan. 9, 1974
[21] Appl. No.: 431,947

[52] U.S. Cl.............................................. 260/248 A
[51] Int. Cl............................................. C07d 55/36
[58] Field of Search................................ 260/248 A

[56] References Cited
UNITED STATES PATENTS

| | | | |
|---|---|---|---|
| 3,107,244 | 10/1963 | Robertson | 260/248 |
| 3,296,262 | 1/1967 | Scott | 260/248 |
| 3,357,979 | 12/1967 | Sobocinski et al. | 260/248 |
| 3,644,359 | 2/1972 | Mesiah et al. | 260/248 |
| 3,761,474 | 9/1973 | Mesiah | 260/248 |

Primary Examiner—John M. Ford

[57] ABSTRACT

Process for recovering cyanuric acid whereby crude cyanuric acid is digested with an aqueous mineral acid digesting solution, cooling the digested crude cyanuric acid to precipitate cyanuric acid crystals, separating the cyanuric acid crystals, dispersing the cyanuric acid crystals in a sufficient amount of water to remove all of the digesting solution from the crystals and to hydrate the cyanuric acid crystals, and recovering free-flowing, hydrated cyanuric acid crystals free of any hard cement-like masses.

7 Claims, No Drawings

PURIFICATION OF CYANURIC ACID

This invention relates to the recovery of hydrated cyanuric acid.

One method for producing cyanuric acid is by heating urea, biuret or urea cyanurate in a kiln at temperatures of about 200° to about 350°C. The crude product produced is composed of cyanuric acid (about 75 percent), ammelide impurities (about 25 percent) and minor amounts of other impurities such as ammonium salts. Cyanuric acid is recovered from the product mixture by digesting the impurities in aqueous mineral acids followed by precipitation of the cyanuric acid crystals from the acid digestion solution. The mineral acids are generally employed in concentrations of about 5 Normal with sulfuric acid being the most preferred acid. The procedure for carrying out this process is described in U.S. Pat. No. 2,943,088.

One of the problems with the above process has been in the separation of the cyanuric acid crystals from the acid digestion solution. It has been pointed out in U.S. Pat. No. 3,107,244 that unless the pH and temperature are carefully controlled and maintained, this separation step is accompanied by the formation of hard cement-like masses of anhydrous cyanuric acid crystals. These cement-like masses plug the separation equipment and are difficult and expensive to remove. The cement-like masses are produced when the anhydrous cyanuric acid crystals are converted to the hydrated cyanuric acid form while the crystals are in contact with one another, for example, in a filter cake. When the crystals are converted in this manner, the cyanuric acid crystals become cemented together. The patentee prevents this cemented product from forming by avoiding the formation of hydrated cyanuric acid. This is achieved by separating the cyanuric acid crystals from the acid digestion solution at temperatures above about 57°C whenever the acid concentration of the liquor is below 2 Normal. While this process overcomes the formation of hydrated cyanuric acid, the use of elevated temperatures reduces the amount of cyanuric acid which can be recovered because increased amounts of cyanuric acid are dissolved in the acid digestion solution at these elevated temperatures.

According to another patented process, namely, U.S. Pat. No. 3,296,262, the formation of hydrated cyanuric acid is prevented by digesting the crude cyanuric acid only with aqueous nitric acid, cooling the digestion mixture to about 25° to 50°C, separating cyanuric acid crystals wet with nitric acid, and washing the crystals with water until the nitric acid concentration in contact with the crystals is below 1.0 Normal but above 0.3 Normal. The washed crystals are then heated to remove water and nitric acid from the crystals to produce a cyanuric acid product with a 99.5 percent or higher purity.

While this process overcomes the formation of hydrated cyanuric acid, the resulting cyanuric acid product is not a pure product since it contains more than 0.1 percent impurities, consisting mainly of ammelide and nitric acid. Even though these impurities are not deleterious for some cyanuric acid uses, they cannot be present for other cyanuric acid uses, as for example, in processes which produce dichloroisocyanuric acids and/or trichloroisocyanuric acids (used in detergent, bleaching and sanitizing formulations as a source of available chlorine) by chlorinating large amounts of cyanuric acid in solution. If chlorination proceeds in the presence of even trace amounts of nitric acid, the reaction stoichiometry is drastically changed, rendering commercial production difficult to monitor and control. Furthermore, if the stoichiometry deviates too far, the explosive compound nitrogen trichloride is produced, thus making the process extremely hazardous.

It has been unexpectedly discovered, that acid digested cyanuric acid can be recovered without the formation of hard cement-like masses in exceptionally high yields, that is, above 95 percent, having exceptionally high purities, that is above 99.9 percent by cooling the acid digestion solution to precipitate cyanuric acid crystals, separating the cyanuric acid crystals from the acid digestion solution, dispersing the cyanuric acid crystals at a temperature below about 57°C in a sufficient amount of water to remove all but residual traces of digestion solution from the crystals, agitating the dispersed crystals for about 0.25 to about 5 hours to hydrate the cyanuric acid crystals and recovering cyanuric acid as a free-flowing hydrated crystalline product free of any hard cement-like masses.

In the process of the invention, crude cyanuric acid containing ammelide is digested with a mineral acid, preferably sulfuric or phosphoric acid. Sulfuric and phosphoric acids are preferred for reasons of economy and ease of handling. Sulfuric acid is most preferred because it takes much less time to effect digestion than phosphoric acid. The acids are employed in concentrations above 2 Normal, with acid concentrations of about 5 Normal being preferred. Digestion is carried out at the atmospheric boiling point of the acid digestion solution, this being about 104°C. Higher temperatures, up to about 130°C, may be employed if superatmospheric pressures up to 100 p.s.i. are employed. Digestion is carried out for from 1 to 10 hours, depending upon the digestion temperature and digestion acid being employed, with sulfuric acid digestion for about 4 hours at 104°C being preferred.

The digestion treatment operates by dissolving all acid-soluble impurities present in the reaction mixture. It hydrolyzes ammelide to yield cyanuric acid and a corresponding ammonium salt, that is ammonium sulfate or ammonium phosphate. Additionally, ammonium cyanurates are hydrolyzed to yield cyanuric acid and a corresponding ammonium salt. At the conclusion of the digestion period the acid digestion solution normally contains about 25 percent by weight cyanuric acid as a slurry.

The hot acid slurry is cooled by any conventional means to precipitate the cyanuric acid. The slurry is cooled from about 104°C to below about 70°C, and preferably from about 0° to about 35°C. Lower temperatures are preferable to higher temperatures since cyanuric acid crystals precipitate from the solution in increasing quantities as the temperature is lowered. Lower temperatures are also preferred since they reduce equipment corrosion rates by reducing mineral acid reactivity. The time rate for cooling the slurry is not critical. Rapid cooling rates of less than 30 minutes are preferable to slower cooling rates in order to increase overall cyanuric acid production.

The cooled cyanuric acid slurry is separated from a substantial portion of the acid digestion solution by any suitable liquid-solid separating means, such as by filtration or centrifugation. The separated acid digestion solution contains most of the dissolved impurities, ammonium salts, and excess mineral acid. A portion of this digestion solution may be continuously purged to remove some of the ammonium salts formed during the hydrolysis step, and the remainder recycled to the digester. Alternatively, the entire acid digestion solution may be discarded as waste. A once-through acid digestion system would improve control over the entire process by eliminating the maintenance necessary to regulate acid concentrations during digestion. The separated wet cyanuric acid cake is soft and can be handled easily.

The wet cyanuric acid cake, damp with digestion solution, is dispersed in a sufficient amount of water at a temperature below about 57°C to remove essentially all of the digestion solution from the cyanuric acid crystals and to convert the cyanuric acid crystals to their hydrated form. The temperature of the water must be maintained below the anhydrous cyanuric acid crystal transition temperature, that is, below about 57°C. If the temperature goes above about 57°C, conversion of the anhydrous crystals to their hydrated form will not take place. Preferably, the temperature is between about 0° and about 30°C, and most preferably between about 10° and about 25°C. The specific amount of water employed is critical only to the extent that it must be sufficient to remove essentially all of the digestion acid from the crystals and hydrate them. Amounts of water that yield 5 to 40 percent cyanuric acid slurry concentrations have been found sufficient for both purposes with lower slurry concentrations being preferred to higher ones.

Removal of the digestion solution from the cyanuric acid crystals yields crystals that can be handled easily and unexpectedly prevents the formation of hard cement-like masses of cyanuric acid. Removal of all of the digestion solution from the crystals is not commercially feasible. However, removal of all but residual trace amounts of digestion solution from the crystals is amply satisfactory from a commercial stand point, that is less than 0.1 percent by weight. These minor traces of digestion solution do not adversely affect the quality or utility of the cyanuric acid crystals and they may be employed in any commercial process.

The dispersed cyanuric acid crystals are preferably mildly agitated by any conventional means to assure removal of digestion solution from the cyanuric acid crystals. Agitation also permits complete and smooth hydration of the dispersed crystals. Hydration will generally be completed within about 0.25 and about 5 hours depending upon such factors as the amount of water and the water temperature.

The dispersed hydrated cyanuric acid crystals are passed to a second liquid-solid separating device, such as a filter or centrifuge, and separated into a pure wet hydrated cyanuric acid cake and filtrate. This separation step removes essentially all of the remaining impurities including the digestion acid from the cyanuric acid crystals. The wet hydrated cyanuric acid cake may be dried and stored, or passed directly to a chlorinator and converted into chloroisocyanuric acids. The conversion of cyanuric acid into chloroisocyanuric acids, such as dichloroisocyanuric acid and/or trichloroisocyanuric acid is well known in the art and does not constitute part of the present invention.

Drying may be carried out in any conventional manner in order to remove residual moisture and to produce a free-flowing crystalline product. If the crystals are heated to temperatures at or above about 120°C, residual moisture and the waters of hydration will be removed from the cyanuric acid crystals to produce an anhydrous cyanuric acid crystal product.

The following examples are given to illustrate the invention, but are not deemed to be limiting thereof. All percentages given are based upon weight unless otherwise indicated.

EXAMPLE 1

Process of the Invention

A 25.8 gram (0.2 mole) sample of crude cyanuric acid prepared from urea assaying about 80.0 percent cyanuric acid and about 20 percent ammelide was mixed with 77.2 grams of 23 percent aqueous sulfuric acid. The mixture was charged into a 200 milliliter three-necked flask equipped with a magnetic stirrer, thermometer, and condenser, and refluxed at 104°C for 4 hours. The mixture was then cooled rapidly in an ice bath to 30°C and the crystallized cyanuric acid was filtered from the slurry. The filtered wet cyanuric acid cake that formed was soft and fluffy. The filtered wet cyanuric acid cake was dispersed in 100 milliliters of water having a temperature of 25°C to remove essentially all traces of the digestion solution from the cyanuric acid crystals, and agitated. The cyanuric acid hydrated smoothly and rapidly, that is, within 15 to 20 minutes. The hydrated cyanuric acid slurry was filtered, and the hydrated cyanuric acid crystals recovered as product. The crystals were then heated to 120°C to remove residual water and water of hydration. The resulting dried cyanuric acid assayed 99.99 percent cyanuric acid and was recovered in a 96.3 percent yield.

EXAMPLE 2

Process of the Invention

A solution identical to that made in Example 1 was refluxed as in Example 1. The mixture was then slowly air cooled to 10°C and the crystallized cyanuric acid was filtered from the slurry. The filtered wet cyanuric acid cake that formed was soft and fluffy. The filtered wet cyanuric acid cake was dispersed in 100 milliliters of water having a temperature of 20°C to remove essentially all traces of the digestion solution from the cyanuric acid crystals, and agitated. The cyanuric acid hydrated smoothly and rapidly. The hydrated cyanuric acid slurry was filtered and the hydrated cyanuric acid crystals recovered as product. The crystals were heated at 120°C to remove residual water and water of hydration. The resulting dried cyanuric acid assayed 99.99 percent cyanuric acid and was recovered in a 97 percent yield.

EXAMPLE A

Comparative Example

A solution identical to that made in Example 1 was refluxed as in Example 1. The mixture was then slowly air cooled to 70°C and the crystallized cyanuric acid was filtered from the slurry. The filtered wet cyanuric acid cake was washed twice with 50 milliliters of water having a temperature of 70°C to remove the digestion solution from the anhydrous cyanuric acid crystals and the anhydrous cyanuric acid crystals were dried at 120°C. The dried, anhydrous cyanuric acid product assayed 99.90 percent cyanuric acid, 0.1 percent ammelide and was recovered in a 90 percent yield.

EXAMPLE B

Comparative Example

A 15 gram sample of essentially pure cyanuric acid was mixed with 85 grams of 20 percent sulfuric acid and refluxed according to Example 1. The mixture was then slowly air cooled to 25°C and the crystallized cyanuric acid was filtered from the slurry. The filtered wet cyanuric acid cake was washed twice with 50 milliliters of water having a temperature of 25°C to remove the digestion solution from the anhydrous cyanuric acid crystals. The resulting cyanuric acid product contained hard cement-like masses that were difficult to handle and remove.

EXAMPLE 3

Process of the Invention

A 22.5 gram (0.17 mole) sample of crude cyanuric acid assaying about 80 percent cyanuric acid and about 20 percent ammelide was mixed with 127.5 grams of 20 percent aqueous phosphoric acid. The mixture was charged into a 200 milliliter three-necked flask equipped with a magnetic stirrer, thermometer, and condenser, and refluxed at about 103°C for about 4 hours. The mixture was then cooled in an ice bath to 25°C and the crystallized cyanuric acid was filtered from the slurry. The filtered wet cyanuric acid cake was dispersed in 100 milliliters of water having a temperature of 25°C to remove essentially all traces of the digestion solution from the cyanuric acid crystals, and agitated. The cyanuric acid hydrated smoothly and rapidly and did not form hard cement-like masses when filtered.

EXAMPLE C

Comparative Example

A solution identical to that made in Example 3 was refluxed, cooled to 25°C, and filtered to separate the crystallized cyanuric acid as in Example 3. The filtered wet cyanuric acid cake was washed three times with 50 milliliters of water having a temperature of 25°C to remove the digestion solution from the anhydrous cyanuric acid crystals. The resulting cyanuric acid product contained hard cement-like masses that were difficult to handle and remove.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A process for recovering cyanuric acid as hydrated cyanuric acid which comprises:
    digesting crude cyanuric acid in a digestion solution containing a mineral acid;
    cooling the digestion solution to precipitate cyanuric acid crystals;
    separating the cyanuric acid crystals from the digestion solution;
    dispersing the cyanuric acid crystals in a sufficient amount of water at a temperature below about 57°C to remove all but residual traces of digestion solution from the crystals;
    agitating the dispersed crystals for about 0.25 to about 5 hours to hydrate the cyanuric acid crystals; and
    recovering free-flowing, hydrated, crystalline cyanuric acid free of any hard cement-like masses.

2. The process of claim 1 wherein the digestion solution is cooled to below about 70°C.

3. The process of claim 1 wherein the digestion solution is cooled to about 0° to about 35°C.

4. The process of claim 1 wherein the water used to disperse the separated cyanuric acid crystals has a temperature between about 0° and about 30°C.

5. The process of claim 1 wherein the water used to disperse the separated cyanuric acid crystals has a temperature between about 10° and about 25°C.

6. The process of claim 1 wherein the hydrated cyanuric acid is dried and dehydrated at a temperature of at least about 120°C.

7. A process for recovering cyanuric acid, which comprises:
    digesting crude cyanuric acid in a digestion solution containing a mineral acid selected from the group consisting of aqueous sulfuric acid and aqueous phosphoric acid;
    cooling the digestion solution to a temperature from about 0° to about 35°C to precipitate cyanuric acid crystals;
    separating the cyanuric acid crystals from the digestion solution;
    dispersing the cyanuric acid crystals in a sufficient amount of water at a temperature between about 0° and about 30°C to remove all but residual traces of digestion solution from the crystals;
    agitating the dispersed crystals for about 0.25 to about 5 hours to hydrate the cyanuric acid crystals; and
    recovering cyanuric acid in a free-flowing hydrated crystalline form free of any hard cement-like masses.

* * * * *